(12) United States Patent
Lang et al.

(10) Patent No.: US 6,753,019 B1
(45) Date of Patent: Jun. 22, 2004

(54) FOOD SUPPLEMENT

(75) Inventors: Timothy Lang, Chatswood (AU); Derek Denton, Toorak (AU); Anthony R Bird, South Australia (AU); David Topping, South Australia (AU)

(73) Assignee: Food Ingredients Technologies Intangibles (Bermuda) Limited, Hamilton (BM)

( * ) Notice: Subject to any disclaimer, the term of this patent is extended or adjusted under 35 U.S.C. 154(b) by 0 days.

(21) Appl. No.: 09/647,882

(22) PCT Filed: Apr. 14, 1999

(86) PCT No.: PCT/AU99/00273

§ 371 (c)(1), (2), (4) Date: Oct. 4, 2000

(87) PCT Pub. No.: WO99/52381

PCT Pub. Date: Oct. 21, 1999

(30) Foreign Application Priority Data

Apr. 14, 1998 (AU) ............................................. PP2915

(51) Int. Cl.$^7$ ........................... A01N 65/00; A61K 35/78
(52) U.S. Cl. ........................ 424/732; 424/736; 424/766; 426/416; 426/531; 426/616; 426/655
(58) Field of Search ................................ 424/736, 732, 424/766; 426/416, 531, 616, 655

(56) References Cited

U.S. PATENT DOCUMENTS

| | | | | |
|---|---|---|---|---|
| 3,973,051 A | * | 8/1976 | Buckley et al. ............. | 426/574 |
| 4,784,861 A | * | 11/1988 | Gori ............................. | 426/74 |
| 4,871,557 A | * | 10/1989 | Linscott ....................... | 426/93 |
| 4,876,102 A | * | 10/1989 | Feeney et al. .............. | 426/550 |
| 5,085,883 A | * | 2/1992 | Garleb et al. ............... | 426/590 |
| 5,304,374 A | * | 4/1994 | Graves et al. .............. | 426/615 |
| 5,476,678 A | * | 12/1995 | Walter et al. ............... | 426/660 |
| 5,616,355 A | * | 4/1997 | Haast et al. ................ | 426/384 |
| 5,624,699 A | * | 4/1997 | Lang .......................... | 426/425 |
| 5,656,734 A | * | 8/1997 | Ehrlich ....................... | 426/615 |
| 6,231,866 B1 | * | 5/2001 | Mann ......................... | 426/590 |
| 6,361,818 B2 | * | 3/2002 | Biyani et al. ............... | 426/640 |
| 6,391,345 B1 | * | 5/2002 | Heeg et al. ................. | 426/629 |

* cited by examiner

*Primary Examiner*—Herbert J. Lilling
(74) *Attorney, Agent, or Firm*—Henry D. Coleman; R. Neil Sudol; William J. Sapone

(57) ABSTRACT

A food supplement which has beneficial effects for bowel health, and a method of preparing the food supplement are disclosed. The food supplement is derived from fiber extracts from two or more types of fruit or vegetables. The fiber extracts have a majority of soluble solids removed therefrom. The two or more types of fruit or vegetable may be selected from the group consisting of grape, citrus, apple, tomato, carrot, mango, cranberry, papaya, banana, pineapple, kiwi fruit, spinach and melon. The beneficial effects for bowel health are manifest in an increase in levels of short chain fatty acids (SCFA's) in the colon.

21 Claims, No Drawings

FOOD SUPPLEMENT

This invention relates to a food supplement, derived from fruit or vegetable fibres, which has beneficial effects for bowel health.

BACKGROUND OF THE INVENTION

Short Chain Fatty Acids (SCFA's) are known to have significant physiological effects on the large bowel. In particular, SCFA's are considered to play a role in the protection against bowel cancer and the development of pathogenic organisms and the development of colonic ulceration and other diseases of the bowel.

SCFA's (acetate, propionate and butyrate) are produced in the large bowel by microbial fermentation. The benefits attributed to these compounds are variously thought to be the result of either reduced pH or beneficial changes to the molar ratios of acetate, propionate and butyrate or some combination of these. The concentration of SCFA's, pH and in particular butyrate concentration are putative indicators of bowel health.

More particularly, butyrate is considered to offer protection against bowel cancer. As most intestinal cancers occur in the distal colon, an increased level of butyrate in this region is a key objective in controlling the incidence and development of this type of cancer.

In the processing of fruit and vegetable for consumption, a considerable amount of the fruit or vegetable remains unused because it is either unpalatable or inconvenient to use. This represents a somewhat inefficient use of resources and leads to a waste disposal problem and a loss of potentially valuable resources.

It is also desirable to have a fibre additive for foods that is a substitute, or a partial substitute for ingredients of commonly used foods substances such as flour in bread. Also desired is that these substitutes do not add to the calorific content of the foods, and in many instances that these substitutes do either not contribute flavours at all or at least do not contribute off flavours. A number of examples of fibre food additives are made from waste from fruit or vegetable processing, and one such example is the use of treated citrus albedo for inclusion of a flour substitute in various cereal products such as bread in U.S. Pat. No. 4526794 by Altomare et al.

DISCLOSURE OF THE INVENTION

It is a finding of this invention that the use of a mixture of fibre extracts from two or more types of fruit or vegetables can have a beneficial effect on the large bowel.

Fibre extracts from apple slices and from the albedo of oranges were extracted by a counter current method and added as a supplement to a standard feed for pigs and to a diet for humans. An unexpected beneficial change in indicators of gut health was found when mixtures of the two fibre extracts were used when compared to the use of each fibre extract separately.

The effect is manifest in an increased production of short chain fatty acids in the large bowel, of which butyrate is the fatty acid that is increased to the greatest degree particularly in the distal colon. The experiments conducted to date are suggestive that the physiology of the large intestine is also somewhat modified in so far as the wall of the large intestine is thickened albeit by a statistically not significant amount, indicating that there may be stimulation of growth.

The term fibre in the context of this invention is intended to convey the meaning of material that is substantially indigestible in the small intestine such that it passes into the large bowel of a human or other omnivorous animal species.

It is thus proposed that in a broad form that the present invention could be said to reside in a food supplement, said food supplement derived from fibre extracts from two or more types of fruit or vegetables, the fibre extracts having had a majority of soluble solids removed therefrom.

At present the reason why such combinations of fibre extracts exert their effect is unknown, it is however thought that removal of a majority of the soluble solids is essential for this to have effect. One hypothesis is that insoluble fibre components presented in this way have a more beneficial action in promoting colonisation of beneficial bacteria in the large intestine, thereby acting as a prebiotic.

The removal of soluble solids also has the side benefit of maximising the potential value obtained from the precursor product in so far as it may be possible to sell some or all of the soluble solids. Additionally the insoluble solids that remain are more convenient for food use because they may be dried and hence put into a wider range of foods than would be possible with soluble materials. Insoluble solids from which soluble solids have been removed also have a tendency to be more stable microbiologically and not to produce off flavours, there is also the possibility that any anti microbial substances (that might otherwise adversely affect beneficial large bowel microflora) present in parts of the fruit are also removed.

The two or more types of fruit or vegetable may be selected from the group consisting of grape, citrus, apple, tomato, carrot, mango, papaya, banana, pineapple, kiwi fruit, spinach and melon.

Preferably the two or more types of fruit or vegetables are selected from the group consisting of, grape, orange, apple, tomato, melon, cranberry and grapefruit.

In an alternative form a first of the two or more fruit and vegetables is a citrus fruit and a second fruit is selected from the group consisting of grape, apple, tomato, carrot, mango, papaya, banana, pineapple, kiwi fruit, spinach, melon and cranberry and more preferably the second fruit is selected from the group consisting of grape, apple, tomato, melon and cranberry. In one convenient form the citrus fruit is an orange.

In another alternative form a first of the two or more fruit and vegetables is an apple, and a second fruit is selected from the group consisting of grape, citrus, tomato, carrot, mango, papaya, banana, pineapple, kiwi fruit, spinach, a melon, and more preferably the second fruit is selected from the group consisting of grape, citrus, tomato, and melon.

In one specific form the fibre extracts from two fruits are used, the two fruits being orange and apple.

Citrus fruits that might be used including orange, grapefruit, tangelo, tangerine, lemon, o kinnow fruit and varietals. When dealing with citrus by product parts, citrus "cups" can be used. Cups are halves of the outer portion of citrus fruits comprising the skin (flavedo) and the pith (albedo) and represent the portion of citrus fruit remaining after conventional juice extraction. Preferably the starting material for fibre extraction is a shaved skin, whereby the flavedo has been removed. The benefit of using albedo is that processing is simplified, so that the strongly flavoured portion of the skin is not included.

For pineapples, the "zenith" solids, which comprise the outer skin and inner core of pineapple can be used. Also whole pineapples can be used.

When papaya is the precursor just the flesh and skin are to be processed. When the seed is included the resultant product has a higher fibre content. Likewise mangos, without seed can be processed.

When a melon is used it might be selected from the group consisting of watermelon, rock melon, honeydew melon or champagne melon.

Without being bound by the same, a possible explanation for the beneficial effects of the combinations of fibre extracts is that the two fibre components each offer different levels of minerals, neutral non starch polysachharides and uronic acids and that a synergy is afforded by a combination of fruits or vegetables having the different levels. Soluble and insoluble neutral non starch polysaccharides, and soluble and insoluble uronic acids provide four possible substrates for microbial growth in the colon. These four possible substrates may result in a series of microbial populations being established along the large bowel, each acclimatised to a preferred substrate and each producing different SCFA's. In this way, the varying molar ratios of the individual SCFA's may be explained.

The high level of calcium and other elements are considered to provide beneficial effects on the proliferation of colon cells, the excretion of bile acids and avoiding mineral losses from occurring, for example with diarrhoea. Thus in the case of a mixture of orange and apple fibres, it has been determined that orange is higher in calcium, soluble neutral non starch polysaccharides and total uronic acids than is the apple. Thus it may be expected that the combination of a first fruit or vegetable having levels of one or more mineral or fibre components that are similar to orange and a second fruit or vegetable having levels comparable to apple may provide the synergistic effect. Some typical compositions of fruits are given in Table 1.

Thus in one embodiment of the invention the invention may be said to reside in a food supplement, said food supplement derived from fibre extracts from two or more types of fruit or vegetables, the fibre extracts having had a majority of soluble solids removed therefrom and wherein a first of the two or more fruits or vegetables has:
  a calcium content of between 4000 and 15000 ppm;
  a soluble neutral non starch polysaccharides content of between 2 and 3 percent dry weight; and
  a total uronic acids content of between 20 and 40 percent dry weight and the second of the two or more fruit or vegetables has:
  a calcium content of between 200 and 1500 ppm;
  a soluble neutral non starch polysaccharides content of between 1 and 2 percent dry weight; and
  a total uronic acids content of between 5 and 20 percent dry weight.

Alternatively the invention may be said to reside in a food supplement derived from fibre extracts from two or more types of fruit or vegetables, the fibre extracts having had a majority of soluble solids removed therefrom and wherein a first of the two or more fruits or vegetables has a calcium content of between 4000 and 15000 ppm and a second of the two or more fruit or vegetables has a calcium content of between 200 and 1500 ppm.

Alternatively still the invention may be said to reside in a food supplement derived from fibre extracts from two or more types of fruit or vegetables, the fibre extracts having had a majority of soluble solids removed therefrom and wherein a first of the two or more fruits or vegetables has a soluble neutral non starch polysaccharide content of between 2 and 3 percent dry weight and a second of the two or more fruit or vegetables has a soluble neutral non starch polysaccharides content of between 1 and 2 percent dry weight.

As a further alternative the invention may be said to reside in a food supplement derived from fibre extracts from two or more types of fruit or vegetables, the fibre extracts having had a majority of soluble solids removed therefrom and wherein a first of the two or more fruits or vegetables has a total uronic acids content of between 20 and 40 percent dry weight and a second of the two or more fruit or vegetables has a total uronic acids content of between 5 and 20 percent dry weight.

Preferably the ratio of the first fibre extract to the second fibre extract in the food supplement is between 1:4 and 4:1 and is most preferably between 2:3 to 3:2. In one preferred from of the invention the two fibre extracts are present in equal amounts by weight.

The invention may also be said to reside in a method of preparing a food supplement derived from fibre extracts from two or more types of fruit or vegetables, the method including the steps of removing a majority of the soluble solids from each of the two or more types of fruit or vegetables separately to give fibre extracts from the two or more fruits or vegetables, and combining the fibre extracts to provide the food supplement.

The method may include the steps of slicing each of the two or more fruits or vegetables into substantially uniform pieces, and substantially removing any remaining seed tissue from the fibre extracts after extraction an then combining the fibre extracts to provide the food supplement.

The method may also include the steps of inactivating enzymes within the fruit or vegetable pieces.

The precursor material is preferably undigested, in the sense that it has not been macerated, or treated enzymically, or by other chemical agents such as acid or alkaline to breakdown the structure of the macromolecules forming the fibres. The structure of the plant material is thus still complex. Thus when an apple is prepared for conventional pressing it is first milled, a process in which almost all of the cell walls are disrupted and in fact compounds normally isolated in cell walls or cytoplasm or vacuoles, nuclei etc are homogenised and begin to react. Many of these reactions are enzymically driven such as depolymerisation of pectin or oxidation. On the other hand when an apple is prepared by a preferred embodiment of this invention the apple is sliced, so that the longest diffusion path is no more than say 1.5 mm. Slicing disrupts only a small proportion of cell walls, perhaps 0.5%, and the enzymes and their substrates are kept separate.

The method of preparing fibre also preferably includes the step of inactivating enzymes within the fruit preparation which might conveniently be by heat inactivation. Thus with the example of apple slices after slicing the slices are flash heated to a temperature at which plasmolysis occurs but no heat damage occurs to flavour compounds (60° C.). This is termed a critical temperature. The resultant increase in permeability of the (still intact) cell wall increases significantly the rate of transfer of soluble solids from solid to liquid phase.

The majority of soluble solids are then removed from the precursor, by extracting liquids. This is achieved by preparing the precursor material to an appropriate size, for example by slicing to a particle with a thickness of no more than about 2 to 3 mm is found optimal for apple slices, and precontacting the precursor food material with an extraction liquid, and then separating the precursor food material from the extraction liquid, the separation occurring to an extent to give the desired reduction in soluble solids.

This extraction liquid is most preferably water, however, a non-aqueous or non-polar solvent might be used to extract water-insoluble or non-polar compounds. Examples of such solvents are, chloroform, hexane, chlorinated hydrocarbons or acetone. A specific example is the extraction of isoflavones and other flavanoids from orange peel using ethanol as the solvent.

It is preferred that water soluble solids are substantially all removed, in which case the fibre product is substantially free of sugars and other very readily soluble solids whereby greater than 90% of soluble solids are removed. One effect of this is that the fibre product is stabilised against microbial attack. That is not to say that microbial degradation of the fibre is totally inhibited, but rather that this is reduced. Generally fungal growth is not inhibited but growth of the more common food spoiling bacteria are.

Additionally by removal of substantially all of the soluble solids the fibre product has a reduced potential for the development of an off taste, because compounds responsible for flavours have been extracted by the extraction process. Removal of substantially all of the soluble solids is intended to mean removal of substantially all soluble solids that are in a free or unbound state.

A processor suitable for extraction by counter current methods is described in Australian Patent No. 543184. Alternatively other extraction apparatus that could be used include a diffuser made by DeDanske Sukkerfabriker of Denmark and a diffuser made by Amos of Germany. It is anticipated that by use of these processes greater than 90% of the water soluble solids are removed, and more preferably from between 93 to 99%.

The benefits of the invention are expected largely to result by reason of fermentation in the large bowel of non-digestible components of the fruits outlined above, and it is anticipated that less purified forms of the fibres will also have a similar effect to that found for the more purified forms of fibre. It is however not desirable to use conventional techniques of expressing juice from fruit because the supplement will be high in flavours, sugars, and acids. The material is unstable microbiologically and enzymatically and will rapidly develop off flavours and odours and will quickly discolour.

In another form the invention may be said to reside in agent for increasing levels of one or more fatty acids to the colon of an animal or human wherein the agent is derived from fibre extracts from two or more types of fruit or vegetables that have had a majority of soluble solids removed therefrom. Preferably the increased level of fatty acids is greater than the level afforded by any one of the fruits or vegetables alone. Preferably also the fatty acid is a short chain fatty acid which may include acetate, propionate and butyrate. The one or more types of fruit and vegetables may be selected from the group described herein.

It will be appreciated that the invention could also reside in a food product having the food supplement. Suitable food products that may contain the food supplement include, but are not limited to, breakfast cereals, granola bars, soups and beverages including fruit juices. Preferably the food product contains between 1 and 50% by weight of the food supplement and most preferably between 1 and 30%. In the case of liquid food products the upper limit to the amount of fibre supplement that may be added is determined by the viscosity of the ensuing product. Thus, preferably soups may contain between 2 and 15% of the food supplement and beverages may contain between 2 and 5% of the food supplement.

For a better understanding the invention will now be described with reference to a number of examples. It is understood that these examples are only illustrative and are not intended to limit the scope of the invention.

DETAILED DESCRIPTION OF EXAMPLES OF THE INVENTION

Preparation of Apple Fibre Extract

Preparation

The apples were of the Granny Smith variety from Batlow in New South Wales, Australia, and were in good condition. Apples were prepared by slicing to a 2 mm thickness with a crinkle cut to provide better structural integrity.

The Counter Current Extractor (CCE)

A counter current juice extractor available from FITA of Sydney Australia was used. The method of extracting juice from fruit and vegetables using this machine is described in Australia Patent No 543184. The CCE was set up with an angle of 4.5° a short cycle time of approximately 17 seconds, a residence time of about 1 hour. Oxidation was minimal at the temperature settings recorded.

The CCE was set up with the following operation conditions:

| | |
|---|---|
| feed rate | 12 kg/hr |
| extraction water | 15 kg/hr |
| angle | 4.5° |
| cycle time | 17 seconds |
| TF time forward | 9.5 sec |
| TR time reverse | 7.2 sec |
| RPM | 3 |
| Temperature at recycle | 63° C. |
| Residence time | 60 minutes |
| Preparation | 2 mm slice (Crinkle cut) |
| Pool level | low |

Extracted slices were recovered from the CCE in thoroughly cleaned plastic containers for further processing. Juice was recovered at a temperature of 18° C. covered stainless steel buckets for further processing.

Fibre Recovery

The fibre emerging from the CCE was collected and held for a period of about 4 hours then milled using a Fitzmill with ½ inch screen. This was to minimise damage to seed and skin tissue.

The fibre was then put through a paddle finisher to remove skin and seed tissue using a 40 thousandth of an inch screen where skin and seed tissue were removed. No attempt was made to dewater the fibre from this trial. When preparing fibre samples for feeding trials the seed tissue was removed but the skin tissue was not removed.

The resultant fibre was relatively free of seed tissue. The yield of fibre emerging from the CCE represented 90% of the mass of the apples entering the process. The balance (10%) represented the soluble solids extracted by diffusion.

Samples of the fibre were dried in an oven the results indicating that there was a recovery of 4.0 to 4.5% of the mass of the apples as dried fibre.

The quality of the fibre, organoleptically, was good being of pale colour and with no propensity to oxidize. It had only a very slight taste of apple which disappeared on drying, it was highly viscous (approximately 3 cm Bostwick) with strong water binding capacity.

Cleaned fibre was packed in heavy duty plastic bags in approximately 10 kg quantities with a maximum thickness of 6 cm. These packages were then stored at −20° C.

Yield of soluble solids in juice 92.9%. It should be noted that in commercial operation the extracted slices will be pressed to remove half their weight as water and this water (or dilute juice) is returned to the CCE as extraction liquor. Therefore yield equivalent is 96.5%. There was no evident browning of the fibre or juice emerging from the machine.

Preparation of Orange Fibre Extract

Preparation

The peel used for this trial was from early season Valencia oranges grown in Berri in the Upper Murray district of South Australia.

Orange albedo was prepared in the following way at the Berri Fruit Juice plant at Berri, South Australia. Peel was returned from brown reamers to brown shavers where a gross separation of Albedo and Flavedo was effected. The separation was imperfect with the Albedo containing approximately 15% flavedo tissue. The two sections of peel from the shavers was packed into cardboard boxes each containing 10 kg. Boxes of Flavedo and Albedo were then frozen to −20° C. and transported to Sydney. Before feed to the CCE the Albedo tissue was thawed, further hand sorted to remove as much flavedo as possible and hand cut to reduce particle size (nominally 20 mm×3 mm thick) using a knife.

CCE Operation

The CCE was set up with the following operation conditions

| | |
|---|---|
| feed rate | 12 kg/hr |
| extraction water | 15 kg/hr |
| angle | 7.0° |
| cycle time | 17 sec |
| TF time forward | 9.5 sec |
| TR time reverse | 7.2 sec |
| RPM | 3 |
| Temperature at recycle | 75° C. |
| Residence time | 60 minutes |
| Preparation | Hand slicing |
| Pool level | Low |

Albedo tissue was fed to the CCE in 1 kg quantities at 5 minute intervals

The CCE was set up at a steep angle (7°) providing sufficient head to overcome the low porosity of the bed and the high viscosity of the extracted liquid. Relatively high temperatures were employed to minimise oxidative damage.

Fibre Handling

The extracted fibre emerging from the CCE was pressed with partial return of press liquor to increase the level of colour, then held for a period of about 2 hours at ambient temperature. Cleaned fibre was packed in heavy duty plastic bags in approximately 10 kg quantities with maximum thickness of 6 cm. These packages were then stored at −18° C.

The fibre produced was of very pale yellow colour and mild bitterness but low in flavour and aroma. A small section of this was dried to constant weight in an over at 110° C. During this operation same maillard browning occurred although this was not severe and is not seen as a major barrier to commercialisation.

Juice

Yield of soluble solids in juice 75%. This yield was deliberately set as it is known that the partition coefficient for say limonin and naringin (bitter principals) between cellulose and orange juices is about 9. With higher yields of solubles unacceptable levels of bitter principals are extracted in the juice. However at a yield of 75% solubles, more than 50% of the bitter principle is carried out with the fibre.

The resultant juice was very bright but whiter in colour when compared to the spectrum of normal commercial orange products. The level of cloud was high. The juice had a viscosity of 18 cp at 12° brix and normal orange juice "mouthfeel". The juice was of good aroma and flavour with high sugar acid ratio (30:1)

Preparation of Carrot and Grape Fibre Extracts

The fibre extracts were prepared according to the method outlined above for the preparation of apple fibre extract.

Preparation of Grapefruit Fibre Extract

The grapefruit fibre extract was prepared using the method set out above for preparation of orange fibre extract.

Preparation of Cranberry Fibre Extract

Cranberry fibre extract is available commercially and is prepared by Ocean Spray International (Tomah, Wis., USA). This extract is prepared as per the procedure outlined above except that the fibre product is reinfused with cranberry juice and marketed as sweetened dried cranberries.

Compositional Analysis of Fibre Extracts or Precursor Fruit

Fibre or precursor samples were frozen until analysis. When thawed, the solids were reconstituted with juice and a homogeneous sub-sample was taken and stored at 4° C. until samples were taken for analyses two hours later. A representative sample was freeze dried at between 5 and 6 millibars and at a temperature of −70° C. to obtain dry matter for subsequent analyses. Following lyophilisation, the samples were milled to a mesh size of 0.5 mm. Analyses (apart from viscosity) were performed on dried and milled samples. Data for selected fruits and vegetables is shown in Table 1.

Analyses were performed as per the following methods, all of which are known in the art.

| | |
|---|---|
| Dry Matter | Lyopholised residue |
| Fat (Ether Extractables) | Ether extract: AOAC 920.39 |
| Ash | Residue from 480° C. furnace |
| Viscosity at a shear rate of 200 sec$^{-1}$ | Cone and Plate Method |
| Simple Sugars and Oligosaccharides | HPLC Method |
| Neutral Non Starch Polysaccharides | GC Uppsala Method |
| Soluble and Insoluble Uronic Acids | AOAC Official Method 994.13 |
| Dubois/Scott Method Lignin | |

Pig Feeding Trials of Fibre Extracts

Materials and Methods

Animals

A total of 28 young-adult male pigs (starting live weight= 32 kg) were chosen for experiment and maintained in individual pens with a concrete floor in a temperature-controlled room at the Pig Nutrition Research Facility (Roseworthy Campus). Pigs were obtained from the commercial piggery at the same institution.

Diets

Composition of the diets is shown in Table 2. The basal (Control) diet was formulated to be high in saturated fat (15% lipid by weight—13% palm oil and 2% safflower oil), and marginal in calcium content (0.4%, by weight). Wheat bran was the source of dietary fibre (17% by weight, equivalent to 7.5% NSP). For treatment diets wheat bran was replaced by fibre extracts of Apple, Orange or Apple+ Orange (in equal amounts)(see Table 2). Formulation of treatment diets was based on results of analyses for total dietary fibre of the two fibre extracts. Pigs were fed twice daily, at 0900 and 1600, at a rate proportional to their metabolic live weight (70 g×LW$^{0.75}$). The daily allowance was adjusted weekly when the animals were weighed. Pigs had unrestricted access to water for the duration of study.

Surgical Preparation and Experimental Design

For logistical reasons the study was split into two staggered sub-experiments (7-day overlap).

During the pre-experimental period, pigs were maintained on their regular commercial, pelleted diet for several days, until surgical implantation of a cephalic vein catheter. Pigs were then divided, on the basis of live weight, into 4 groups of six animals each. The remaining four animals were used as reserves. Immediately after surgery pigs were transferred to the Control diet (Day 7). After a further 7 days, three of the groups were randomly assigned to experimental diets, while the fourth group (and the unassigned animals) continued to be fed Control diet. Diets were fed for the remaining 21 days of experiment (days 7 to 28) and, at the end of the feeding period, pigs were anaesthetised in order to allow the designated samples to be collected, and then slaughtered.

Experimental Procedure and Measurements

Catheters were maintained by daily flushing of the dead-space with heparinised saline. Fasting blood samples were taken on 5 occasions (days 1, 7, 14, 21, and 28). The blood sample on Day 28 was taken from the abdominal aorta; all other blood samples were via cephalic vein catheter.

At the completion of the feeding period (day 28, ~21 days after the introduction of treatment diets) and approximately 16 hours after the pigs had been fed the evening before, they were weighed and anaesthetised (intravenous infusion of Pentothal). The abdominal cavity was opened and blood collected from the abdominal aorta, and the GI tract was then ligated and excised, along with the liver. The liver was blot-dried and weighed, and a sample collected and snap-frozen. The small and large bowels were isolated and measured. The colon was divided into three segments of equal length, and the content of each of those segments, and that of the caecum, were extruded, weighed and sub sampled. The colon and caecum, devoid of contents, were blotted dry and weighed.

Small samples of liver and plasma were analysed for cholesterol content using gas chromatography. Digesta was diluted with distilled water for determination of pH and dry matter by standard techniques, and short-chain fatty acids (SCFA), caecal bile acids and neutral sterols by GC procedures.

Data Analysis

Data are shown as the mean and pooled standard error of the mean (SEM), with the number of observations per group as indicated in the tables. Statistical analysis was by one-way analysis—variance (ANOVA) and when significant values were detected (F value P<0.05), differences between individual means were then analysed by the PDIFF procedure of SAS. Differences between treatment means are considered significant at P<0.05. For tabulated results, values within a column with different superscripts differ significantly.

Hepatic and digesta metabolise pools were calculated as:

Concentration (μmol/g or mmol/L)×weight of liver (g), or volume of digesta water (mL).

Results

Animal Health

During the pre-experimental period it was necessary to substitute a pig that had become lame for one from the reserve group. The catheters of two pigs in the Apple group ceased to function on about day 14 of the trial and therefore two additional pigs from the reserve group were assigned to this treatment. Consequently, at the time of slaughter, these two animals had been fed the treatment diet for just 14 days. However, as the results for these two animals were not substantially different from others in the group, they were therefore included in subsequent statistical analyses. One pig from the Apple+Orange group was euthanased just prior to completion of the study for reasons of illness (apparently unrelated to diet). During intubation (for catheterisation), several pigs were found to have a throat infection, however this appeared to be a minor ailment and did not affect food consumption or rate of growth.

Food Acceptability and Live Weight Gain

Pigs found the diets acceptable, and there were no indications of overt adverse reactions. Pig growth rate (and feed conversion efficiency) during the period of study was satisfactory (average daily gain was ~500 g/d), and within the range encountered in commercial piggeries. Diet had no significant effect on live weight change during the feeding period (Table 3). The growth rate data is confirmation that there were no serious adverse reactions (eg diarrhoea, gastrointestinal disturbances or nutritional deficiencies) to these diets.

Small and Large Bowel Morphology

Neither intestinal length nor mass were influenced by dietary treatments (Table 4). Caecal and colonic weight were greatest in pigs fed Apple+Orange, however the differences were not statistically significant. Also, there were no differences between treatments for weight of the individual colonic segments (data not shown).

The Apple+Orange diet may have had a stimulatory effect on intestinal growth, as intestinal mass of the small bowel, caecum and colon were each greater numerically than that of any other treatment (but statistically not significant). Given that the colon of this group was about 10% heavier, and slightly shorter in length, than that of the others, it would suggest that the mixed fibre diet may have resulted in a thickening of the colonic wall. It is worth noting that the mixed fibre diet was particularly effective in raising SCFA levels at various sites in the large bowel (see later). These metabolites are potent trophic agents for intestinal mucosa.

Large Bowel Digesta Mass and Water Content

Generally, digesta mass was similar for the four groups (Table 5). Digesta mass of pigs fed wheat bran was greater at each of the large bowel sampling sites, however, these differences reached statistical significance for the mid colon only. Digesta moisture content declined progressively from the caecum through to the distal colon (Table 6). There were no significant treatment differences for this variable in the caecum and proximal colon, however, in the mid colon, water content of digesta in pigs fed Wheat bran was greater than that of the Apple treatment, but not significantly, compared to other treatments. Digesta in the distal colon of pigs given wheat bran contained about 10% more water than that for any of the other dietary treatments.

Similar amounts of wet digesta mass in the caecum of each group suggests that the amount of material entering the large bowel, which is primarily non-absorbed carbohydrate, is similar. For the Wheat bran group, there appears to be a progressive loss of material along the colon, however, for fibre extract treatments, fermentation occurs mainly in the proximal and mid colon. This finding reflects and confirms the highly fermentable nature of the fibre extract products. As large bowel bacteria catabolise fibre, its structure, and hence, water-holding capacity diminishes, along with the contribution that these materials could make to digesta mass and, hence, faecal weight. Although the fibre extracts would be expected to promote growth of enteric bacteria, this activity would occur primarily in the proximal region of the large bowel, and the contribution of expanded bacterial biomass to stool output may not be large. Data for the large bowel is compatible with the finding that the faeces of pigs fed diets containing fibre extracts, compared to Wheat bran, were much firmer, and formed into dense pellets. The apparent "constipating" effects of the fibre extract diets, however, do not appear to have been particularly serious (food intake, for example, was not compromised). Earlier studies have indicated that the optimal water content in digesta and faeces is 70–80%. Also, because wheat bran is the most effective dietary fibre source for promoting stool weight (and alleviating constipation in human), differences with other fibres in relation to faecal output and consistency are expected.

Large Bowel pH

At each of the intestinal sampling sites, acidic conditions were found in large bowel lumen of those pigs receiving fibre extracts, compared to the Wheat bran. Differences in pH for the individual fibre extract treatments (Table 7) were not significant.

The fermentability of fibre extracts is clearly reflected in the acidic conditions found in the large bowel, especially in the caecum, and to a lesser extent, in the colon. Acidification of luminal contents has desirable health consequences, in that the formation, availability and absorption of various carcinogens and toxic materials in the hindgut is reduced. Indeed, a high pH in the human large bowel is thought to be a risk factor for colorectal cancer.

Large Bowel Short Chain Fatty Acid Concentrations

Generally, concentrations of total SCFA tended to be greatest in the caecum and proximal colon compared to the other sites, and throughout the large bowel, levels of these metabolites were higher in pigs fed fibre extracts (particularly for the diet containing mixed fibres) relative to Wheat bran, although only a few differences reached statistical significance (Table 8). Profiles for each of the individual SCFA were similar (Table 9–11). Compared to Wheat bran, the Apple+Orange treatment produced substantially higher butyrate concentrations in the proximal and distal colon. Total and individual SCFA values for the mixed fibre treatment were (numerically) greater than those values obtained for either Apple or Orange fibre.

The finding that fibre extracts were effective in raising SCFA level is significant because of the purportive role of these metabolites in the prevention and amelioration of important large bowel diseases. The mixed fibre diet was particularly effective in raising butyrate levels throughout the large bowel, especially in the distal colon, which is the site of most bowel disease in humans. The extent to which the level of SCFA and in particular butyrate has increased is quite surprising and is indicative of a synergy that has taken place between the fibre extracts. The exact nature of the synergy is unknown but it is expected that the synergy will also take place between fibre extracts of other fruit and vegetable sources. The effect of continued consumption of the mixed fibre product however is suggested to enhance the bacteria in the large intestine that are capable of producing SCFA and thereby reducing the population of bacteria that lead to adverse health effects.

The fibre extracts used are convenient to handle because they are fermentable in the large bowel, and are not heat labile.

It is thought that the high pectin content of the two fibre extracts used provides a fermentable fibre but the nature of the synergy is not clear at present.

Human Feeding Trials of Fibre Extracts

Materials and Methods

Subjects

The study group consisted of 23 volunteers, 12 males and 11 females, aged between 39 and 70 years (mean SEM 51.3±1.8 y) and BMI 24.26±0.49 kg/m$^2$.

Diets

The study consisted of a balanced, two-period crossover trial preceded by a baseline (reference) period. Subjects were randomly allocated to either the Wheat bran cereal or the test cereal (PTI fibre) supplement group for 14 days and then assigned to the alternative dietary supplement for the same period of time.

The two dietary supplements were extruded breakfast cereals prepared from digestible starch and either Wheat bran or an orange and apple fibre extract (PTI fibre) as the test fibre. Volunteers were provided with 34 or 45 g daily portions of PTI or Wheat bran cereal, respectively, equivalent to approximately 15 g of dietary fibre. They were asked to consume daily the respective supplements for each of the 2-week intervention periods. Fibre intake was restricted to about 20 g/day during the Baseline (pre-supplementation) period by providing subjects with a low fibre cereal and advising them to avoid designated high fibre foods which they also refrained from eating throughout the study.

Experimental Procedure and Measurements Stools were collected over a 48-hour period prior to (Baseline) and 2 weeks after commencing each intervention. Faecal specimens were weighed, mixed thoroughly before a subsample of approximately 1 g was taken for estimation of water content. A further subsample of faeces was diluted with a known volume of internal standard, for SCFA determination, and the pH of the slurry determined by insertion of an appropriate electrode. Total and major individual short-chain fatty acid concentrations were measured by gas chromatography.

Data Analysis

Faecal data were analysed as a randomised complete block design by two-way analysis of variance using the General Linear Model procedure of Statistical Analytical Systems. Gender was used as the block. Differences between baseline and dietary treatments were determined using the protected difference procedure of SAS. Results are presented as least squares means and their pooled standard error (SEM).

Results

Large Bowel pH

Acidic conditions were found in faecal samples before and after receiving fibre extracts (Tables 12, 13). Differences in pH for the extract treatments and the Wheat bran treatment were not significant Large Bowel Shorn Chain Fatty Acid Concentrations Generally, concentrations of total SCFA tended to higher in subjects fed fibre extracts relative to Wheat bran (Tables 14–17). Profiles for each of the individual SCFA were similar (Tables 14–17).

Formulations Containing Fibre Extracts

Breakfast Cereal

An example of a food product to which the apple and orange fibre mix, in the proportions set out above might be added is set out below.

A breakfast cereal formulation is as follows:

|  | Normal | With fibre mixture |
| --- | --- | --- |
| Maize flour | 91% | 77% |
| Fibre mixture | — | 14% |
| Malt | 3% | 3% |
| Sugar | 5% | 5% |
| Salt | 1% | 1% |

The process of making the corn flake product with fibre mixture is the same as making the cornflake mixture with the normal mix and is in accordance with methods known to the person skilled in the art.

An example of a breakfast cereal to which the carrot and grape fibre mix might be added is as follows:

| Carrot fibre | 16% |
| --- | --- |
| Grape fibre | 16% |
| Wheat or cornflour | 21% |
| Wheat bran | 19% |
| Malt | 10% |
| Sugar | 17.2% |
| Salt | 0.8% |

An example of a breakfast cereal to which the cranberry and grapefruit fibre mix might be added is as follows:

| Cranberry fibre | 19% |
| --- | --- |
| Grapefruit fibre | 13% |
| Wheat or cornflour | 21% |
| Wheat bran | 19% |
| Malt | 10% |
| Sugar | 17.2% |
| Salt | 0.8% |

An example of a granola to which the apple and orange fibre mix might be added is as follows:

| Rolled oats | 30% |
| --- | --- |
| Apple fibre | 16% |
| Orange fibre | 15% |
| Crisped Rice | 11% |
| Almonds | 8% |
| Coconut | 8% |
| Gum Arabic | 5% |
| Gum Ghatti | 4% |
| Guar Gum | 3% |

An example of a fruit juice to which the apple and orange fibre mix might be added is a commercial orange juice (98% juice) to which 3% by weight of the fibre mix is added.

An example of a soup to which the carrot and grape fibre mix might be added is a commercial vegetable soupo mix containing vegetables, meat stock and starch to which is added 8% by weight of the fibre mix.

Various features of the invention have been particularly shown and described in connection with the exemplified embodiment of the invention, however, it must be understood that these particular arrangements merely illustrate and that the invention is not limited thereto and can include various modifications falling within the spirit and scope of the invention.

TABLE 1

Relative compositions of selected fruits and vegetables

| | Fruit 1 | | | Fruit 2 | | |
| --- | --- | --- | --- | --- | --- | --- |
| Component | Apple | Grape | Cranberry | Orange | Grapefruit | Carrot |
| Calcium (ppm) | 1434 | 500–1000 | 319 | 10071 | 10000 | 4309 |
| Potassium (ppm) | 3518 | 7000 | 1750 | 1821 | 1800 | 7794 |
| Soluble NNSP (% dry wt.) | 1.43 | 1.30 | 1.5 | 2.23 | 2.25 | 2.19 |
| Total NNSP (% dry wt.) | 29.91 | 29–30 | 30.0 | 29.98 | 30.0 | 29.17 |
| Soluble uronics (% dry wt.) | 10.0 | 5.0 | 5.0 | 14.0 | 14.0 | 6.7 |
| Total uronics (% dry wt.) | 16.8 | 9.0 | 10.0 | 31.9 | 32.0 | 21.1 |
| Lignin (% dry wt.) | 24.0 | 24.0 | 24.0 | 25.0 | 25.0 | 18.6 |

TABLE 2

Composition of experimental diets (g/kg)

| Ingredient | Control | Apple | Orange | Apple + Orange |
| --- | --- | --- | --- | --- |
| Casein | 160 | 143 | 144 | 143 |
| Starch | 497 | 497 | 497 | 497 |
| Sugar | 100 | 53 | 58 | 55 |
| Palm oil | 130 | 188 | 188 | 188 |
| Safflower oil | 20 | 20 | 20 | 20 |
| Wheat bran | 75 | — | — | — |
| Apple extract | — | 106 | — | 53 |
| Orange extract | — | 13.3 | 96 | 48 |
| Dicalcium phosphate | 13.3 | 13.3 | 13.3 | 13.3 |
| Minerals (other) | 3.2 | 3.2 | 3.2 | 3.2 |
| Vitamins | 1.5 | 1.5 | 1.5 | 1.5 |

TABLE 3

Initial and final live weight, and live weight gain of pigs

| | Live Weight | | |
| --- | --- | --- | --- |
| Dietary group | Initial | Final kg | Live Weight Gain |
| Wheat bran | 31.6 | 48.1 | 16.5 |
| Apple | 31.8 | 46.1 | 14.2 |
| Orange | 33.2 | 47.8 | 14.6 |
| Apple + Orange | 33.5 | 48.7 | 15.2 |
| SEM | 1.3 | 1.8 | 1.0 |

Values are means for 7, 8, 6 and 5 observations for treatments Wheat bran, Apple, Orange and Apple + Orange, respectively.
Treatment differences are not statistically significant ($P < 0.05$).

TABLE 4

Morphology of the small and large bowel

| | Small Intestine | Caecum | | Colon | |
| --- | --- | --- | --- | --- | --- |
| Dietary group | Length m | Weight g | Length cm | Weight g | Length m |
| Wheat bran | 15.29 | 95.9 | 16.7 | 568 | 2.97 |
| Apple | 15.15 | 101.5 | 15.6 | 550 | 2.84 |
| Orange | 14.65 | 89.7 | 14.8 | 547 | 2.81 |

TABLE 4-continued

Morphology of the small and large bowel

| Dietary group | Small Intestine Length m | Caecum Weight g | Length cm | Colon Weight g | Length m |
|---|---|---|---|---|---|
| Apple + Orange | 15.32 | 109.8 | 15.2 | 613 | 2.77 |
| SEM | 0.51 | 9.4 | 1.0 | 34 | 0.12 |

Values are means, with number of observations as per Table 5.

TABLE 5

Wet weight of digesta in the large bowel

| Dietary Group | Caecal | Proximal colon | Mid colon g | Distal colon | Total colon |
|---|---|---|---|---|---|
| Wheat bran | 152 | 349 | 216[a] | 154 | 871 |
| Apple | 135 | 252 | 117[c] | 107 | 611 |
| Orange | 169 | 274 | 118[b] | 81 | 642 |
| Apple + Orange | 143 | 243 | 129[b] | 112 | 627 |
| SEM | 37 | 39 | 27 | 22 | 90 |

Values are means, with number of observations as per Table 2. Means in the same column with different superscript letters differ ($P < 0.05$).
[a-b]$P < 0.05$,
[a-c]$P < 0.01$.

TABLE 6

Water content of digesta in the large bowel

| Dietary Group | Caecal | Proximal colon | Mid colon % | Distal colon |
|---|---|---|---|---|
| Wheat bran | 88 | 84.4 | 79.8[a] | 73.2[a] |
| Apple | 90.4 | 83.6 | 74.5[b] | 63.2[c] |
| Orange | 88.4 | 82.1 | 76.5 | 63.9[c] |
| Apple + Orange | 91.0 | 84.0 | 76.0 | 62.8[c] |
| SEM | 2.1 | 2.0 | 2.0 | 2.0 |

Values are means, with number of observations as per Table 5. Means in the same column with different superscript letters differ
[a-b]$P < 0.05$;
[a-c]$P < 0.01$.

TABLE 7 pH of digesta in the large bowel

| Dietary Group | Caecal | Proximal colon | Mid colon | Distal colon |
|---|---|---|---|---|
| Wheat bran | 7.13[a] | 7.10[a] | 7.21[a] | 7.09[a] |
| Apple | 5.84[d] | 6.18[d] | 6.24[d] | 6.29[d] |
| Orange | 5.84[d] | 6.09[d] | 6.14[d] | 6.28[d] |
| Apple + Orange | 5.85[d] | 6.06[d] | 6.06[d] | 6.05[d] |
| SEM | 0.16 | 0.11 | 0.13 | 0.13 |

Values are means, with number of observations as per Table 2. Means in the same column with different superscript letters differ
[a-b]$P < 0.05$;
[a-c]$P < 0.01$,
[a-d]$P < 0.01$.

TABLE 8

Concentration of total SCFA in the large bowel

| | Caecal | Proximal colon | Mid colon | Distal colon |
|---|---|---|---|---|
| Dietary Group | | mmol/L | | |
| Wheat bran | 62.8 | 60.5[a] | 53.1 | 55.4 |
| Apple | 68.3 | 71.1[a] | 55.4 | 43.7 |
| Orange | 75.5 | 79.9[ac] | 67.6 | 42.5 |
| Apple + Orange | 88.2 | 93.3[c] | 76.3 | 61.7 |
| SEM | 15.7 | 7.3 | 8.3 | 6.7 |

Values are means, with number of observations as per Table 2. Means in the same column with different superscript letters differ:
[a-c]$P < 0.01$.
For the Proximal colon, Wheat bran vs Orange, $P = 0.07$; for Mid colon and Distal colon, ANOVA F value not significant. For Mid colon, Wheat bran vs Apple + Orange, $P = 0.073$; Apple vs Apple + Orange, $P = 0.095$. For Distal colon, Apple + Orange vs Apple, $P = 0.074$, Apple + Orange vs Orange, $P = 0.074$.

TABLE 9

Concentration of total acetate in the large bowel

| | Caecal | Proximal colon | Mid colon | Distal colon |
|---|---|---|---|---|
| Dietary Group | | mmol/L | | |
| Wheat bran | 40.8 | 38.6[a] | 33.7 | 35.2 |
| Apple | 43.0 | 42.4[bc] | 33.3 | 27.0 |
| Orange | 48.6 | 48.5 | 39.6 | 26.6 |
| Apple + Orange | 59.2 | 60.1[c] | 46.2 | 36.7 |
| SEM | 10.2 | 4.8 | 5.3 | 4.2 |

Values are means, with number of observations as per Table 2. Means in the same column with different superscript letters differ:
[a-b]$P < 0.05$;
[a-c]$P < 0.01$.

TABLE 10

Concentration of propionate in the large bowel

| | Caecal | Proximal colon | Mid colon | Distal colon |
|---|---|---|---|---|
| Dietary Group | | mmol/L | | |
| Wheat bran | 17.3 | 15.7 | 12.0 | 12.6 |
| Apple | 19.5 | 19.6 | 12.9 | 8.38 |
| Orange | 21.2 | 22.6 | 18.1 | 8.73 |
| Apple + Orange | 21.2 | 22.7 | 19.1 | 11.9 |
| SEM | 4.4 | 2.3 | 2.7 | 1.7 |

Values are means, with number of observations as per Table 2.
ANOVA F value not significant.
For Mid colon, Wheat bran vs Apple + Orange, $P = 0.085$.
For Distal colon, Wheat bran vs Apple, $P = 0.076$.

TABLE 11

Concentration of butyrate in the large bowel

| | Caecal | Proximal colon | Mid colon | Distal colon |
|---|---|---|---|---|
| Dietary Group | | mmol/L | | |
| Wheat bran | 4.74 | 6.06 | 7.43 | 7.67[a] |
| Apple | 5.83 | 9.15 | 9.20 | 8.28[a] |
| Orange | 5.73 | 8.80 | 9.90 | 7.13[a] |

TABLE 11-continued

Concentration of butyrate in the large bowel

| Dietary Group | Caecal | Proximal colon | Mid colon | Distal colon |
|---|---|---|---|---|
| | | mmol/L | | |
| Apple + Orange | 7.80 | 10.4 | 11.0 | 13.0b |
| SEM | 1.62 | 1.1 | 1.4 | 1.4 |

Values are means, with number of observations as per Table 2. Means in the same column with different superscript letters differ:
ANOVA F value not significant for Caecum, Proximal and Mid colon. For Proximal colon, Wheat bran vs Apple, P = 0.052.

TABLE 12

Faecal pH, moisture content, and wet and dry weight in volunteers before and after dietary supplementation1

| | Dietary Treatment | | | |
|---|---|---|---|---|
| Period & Measurement2 | Baseline | Fruit-fibre product | Wheat bran cereal | Pooled sem3 |
| pH | 6.91 | 6.76 | 6.81 | 0.10 |
| Wet weight (g) | 260a | 337b | 347b | 25 |
| Moisture content (%) | 26.7 | 25.1 | 25.7 | 1.3 |
| Dry weight (g) | 64.9a | 79.5b | 85.4b | 5.2 |

1Data were analysed as completely randomised design using analysis of variance. Means separation was by protected difference option of SAS. Values are least squares means for 23 observations.
2Faecal samples were collected over two consecutive days immediately prior to (Baseline) and after 4 weeks of dietary treatment.
3Pooled standard error of least squares means (SEM).
a–bP < 0.05. For faecal dry weight, Baseline vs Wheat bran, P = 0.007.

TABLE 13

Faecal pH, moisture content, and wet and dry weight in male and female volunteers before and after dietary supplementation1

| | Dietary Treatment | | | |
|---|---|---|---|---|
| Period & Measurement2 | Baseline | Fruit fibre product | Wheat bran cereal | Pooled sem3 |
| pH | | | | |
| Male | 6.96 | 6.74 | 6.70 | 0.14 |
| Female | 6.85 | 6.79 | 6.92 | 0.15 |
| Wet weight (g) | | | | |
| Male | 296a | 416b | 408b | 36 |
| Female | 225 | 258 | 286 | 35 |
| Moisture content (%) | | | | |
| Male | 23.5 | 23.5 | 24.6 | 1.8 |
| Female | 29.9 | 26.6 | 26.7 | 1.9 |
| Dry weight (g) | | | | |
| Male | 68a | 95b | 100b | 7 |
| Female | 61 | 64 | 71 | 7 |

1Data were analysed as completely randomised design using two-way analysis of variance. Means separation was by protected difference option of SAS. Values are least squares means for 12 female and 13 male volunteers.
2Faecal samples were collected over two consecutive days immediately prior to (Baseline) and after 4 weeks of dietary treatment.
3Pooled standard error of least squares means (SEM).

TABLE 14

Faecal short chain fatty acid (SCFA) concentrations and molar ratios weight in volunteers before (Baseline) and after dietary supplementation1

| | Dietary Treatment | | | |
|---|---|---|---|---|
| Period & Measurement2 | Baseline | Fruit-fibre product | Wheat bran cereal | Pooled sem3 |
| | Faecal SCFA concentration (mM) | | | |
| Acetate | 47.4 | 58.5 | 51.1 | 4.9 |
| Propionate | 13.5 | 15.7 | 13.5 | 1.3 |
| Butyrate | 16.7 | 19.9 | 17.9 | 2.3 |
| Total SCFA | 77.6 | 94.1 | 82.4 | 8.2 |
| SCFA molar ratio (A:P:B)4 | 61:18:22 | 63:17:20 | 63:17:20 | — |

1Data were analysed as completely randomised design using analysis of variance. Means separation was by protected difference option of SAS. Values are least squares means for 23 observations.
2Faecal samples were collected over two consecutive days immediately prior to (Baseline) and after 4 weeks of dietary treatment.
3Pooled standard error of least squares means (SEM).

TABLE 15

Faecal short chain fatty acid (SCFA) concentrations and molar ratios weight in male and female volunteers before (Baseline) and after dietary supplementation1

| | Dietary Treatment | | | |
|---|---|---|---|---|
| Period & Measurement2 | Baseline | Fruit fibre product | Wheat bran cereal | Pooled sem3 |
| | Faecal SCFA concentration (mM) | | | |
| Acetate | | | | |
| Male | 42.2a | 61.6b | 53.8 | 6.8 |
| Female | 52.7 | 55.5 | 48.5 | 7.1 |
| Propionate | | | | |
| Male | 12.7 | 17.0 | 13.9 | 1.9 |
| Female | 14.7 | 14.3 | 13.0 | 1.9 |
| Butyrate | | | | |
| Male | 16.2 | 17.3 | 16.6 | 3.3 |
| Female | 17.2 | 22.5 | 19.1 | 3.2 |
| Total SCFA | | | | |
| Male | 72.0 | 101.1 | 86.8 | 11.3 |
| Female | 83.3 | 87.1 | 78.0 | 11.8 |
| SCFA molar ratio (A:P:B)4 | | | | |
| Male | 58:19:24 | 61:17:22 | 62:17:21 | — |
| Female | 64:17:19 | 65:17:18 | 64:17:20 | — |

1Data were analysed as completely randomised design using two-way analysis of variance. Means separation was by protected difference option of SAS. Values are least squares means for 12 female and 13 male volunteers.
2Faecal samples were collected over two consecutive days immediately prior to (Baseline) and after 4 weeks of dietary treatment.
3Pooled standard error of least squares means (SEM). For propionate concentration: Baseline vs PTI product, P = 0.103 for male volunteers. For total SCFA concentration: Baseline vs PTI product, P = 0.073 for male volunteers.

TABLE 16

Faecal short chain fatty acid (SCFA) excretion in volunteers before (Baseline) and after dietary treatments1

| Period & Measurement2 | Baseline | Fruit fibre product | Wheat bran cereal | Pooled sem3 |
|---|---|---|---|---|
| | Faecal SCFA excretion (mmol) | | | |
| Acetate | 9.91a | 16.44b | 14.10 | 2.10 |
| Propionate | 2.85 | 4.36 | 3.72 | 0.56 |
| Butyrate | 3.63 | 5.89 | 5.13 | 0.97 |
| Total SCFA | 16.38a | 26.69b | 22.95 | 3.54 |

1Data were analysed as completely randomised design using analysis of variance. Means separation was by protected difference option of SAS. Values are least squares means for 23.
2Faecal samples were collected over two consecutive days immediately prior to (Baseline) and after 4 weeks of dietary treatment.
3Pooled standard error of least squares means (SEM).
a–b$P < 0.05$. For propionate and butyrate excretion: Baseline vs PTI product, $P = 0.060$ and $0.105$, respectively.

TABLE 17

Faecal short chain fatty acid (SCFA) excretion in male and female volunteers before (Baseline) and after dietary treatments1

| Period & Measurement2 | Baseline | Fruit fibre product | Wheat bran cereal | Pooled sem3 |
|---|---|---|---|---|
| | Faecal SCFA excretion (mmol) | | | |
| Acetate | | | | |
| Male | 10.11a | 21.02b | 16.82 | 2.91 |
| Female | 9.70 | 11.86 | 11.38 | 3.04 |
| Propionate | | | | |
| Male | 3.02a | 5.62b | 4.38 | 0.77 |
| Female | 2.68 | 3.10 | 3.06 | 0.81 |
| Butyrate | | | | |
| Male | 4.36 | 8.15 | 6.24 | 1.35 |
| Female | 2.90 | 3.64 | 4.02 | 1.41 |
| Total SCFA | | | | |
| Male | 17.48a | 34.79b | 27.45 | 4.89 |
| Female | 15.29 | 18.59 | 18.46 | 5.11 |

1Data were analysed as completely randomised design using two-way analysis of variance. Means separation was by protected difference option of SAS. Values are least squares means for 23.
2Faecal samples were collected over two consecutive days immediately prior to (Baseline) and after 4 weeks of dietary treatment.
3Pooled standard error of least squares means (SEM).
a–b$P < 0.05$.
For butyrate excretion: Baseline vs PTI product, $P = 0.051$ for male volunteers.

What is claimed is:

1. A food additive, said food additive comprising fibre preparations from two or more types of fruit or vegetables, the fibre preparations having undergone an extraction to remove greater than 90% of water soluble solids therefrom the fibre preparations consisting of the unsolubilized residue of the extraction, wherein a first of the two or more fruits or vegetables has a calcium content of between 4000 and 15000 ppm and a second of the two or more fruit or vegetables has a calcium content of between 200 and 1500 ppm.

2. A food additive, said food additive comprising fibre preparations from two or more types of fruit or vegetables, the fibre preparations having undergone an extraction to remove greater than 90% of water soluble solids therefrom the fibre preparations consisting of the unsolubilized residue of the extraction, wherein a first of the two or more fruits or vegetables has a soluble neutral non starch polysaccharide content of between 2 and 3 percent dry weight and a second of the two or more fruit or vegetables has a soluble neutral non starch polysaccharides content of between 1 and 2 percent dry weight.

3. A food additive, said food additive comprising fibre preparations from two or more types of fruit or vegetables, the fibre preparations having undergone an extraction to remove greater than 90% of water soluble solids therefrom the fibre preparations consisting of the unsolubilized residue of the extraction, wherein a first of the two or more fruits or vegetables has a total uronic acids content of between 20 and 40 percent dry weight and a second of the two or more fruit or vegetables has a total uronic acids content of between 5 and 20 percent dry weight.

4. A food additive, said food additive comprising fibre preparations from two or more types of fruit or vegetables, the fibre preparations having undergone an extraction to remove greater than 90% of water soluble solids therefrom the fibre preparations consisting of the unsolubilized residue of the extraction, wherein the first of the two or more fruits or vegetables has:
    a calcium content of between 4000 and 15000 ppm;
    a soluble neutral non starch polysaccharides content of between 2 and 3 percent dry weight; and
    a total uronic acids content of between 20 and 40 percent dry weight and the second of the two or more fruit or vegetables has:
      a calcium content of between 200 and 1500 ppm;
      a soluble neutral non starch polysaccharides content of between 1 and 2 percent dry weight; and
      a total uronic acids content of between 5 and 20 percent dry weight.

5. A food additive according to claim 4 wherein the first of the two or more fruit and vegetables is an orange, and the second of the two or more fruit or vegetables is selected from the group consisting of apple, grape and cranberry.

6. A food additive according to claim 5 wherein the first of the two or more fruit and vegetables is an orange and the second of the two or more fruit or vegetables is an apple.

7. A food additive according to claim 4 wherein the first of the two or more fruit and vegetables is a grapefruit, and the second of the two or more fruit or vegetables is selected from the group consisting of apple, grape and cranberry.

8. A food additive comprising a mixture of a first fiber preparation from a first fruit or vegetable, and a second fiber preparation from a second fruit or vegetable, the first fiber preparation and the second fiber preparation are prepared by
    slicing the two or more fruits or vegetables into substantially uniform pieces,
    extracting soluble solid by contacting the pieces with an extraction liquid under conditions to remove a majority of water soluble solids, and
    substantially removing any remaining seed tissue from the fibre the first fruit or vegetable being one or more selected from the group consisting of citrus tomato, carrot, mango, papya, banana, pineapple, kiwi fruit, spinach, and the second fruit or vegetable being one or more selected from the group consisting of melon, grape, apple and cranberry.

9. The food additive of claim 8 wherein the enzymes within the fruit or vegetable are inactivated before extraction.

10. The food additive of claim 9 wherein the inactivation is by heat.

11. The food additive of claim 8 wherein the sliced fruit is flash heated at about 60° C.

12. The food additive of claim 8 wherein the sliced fruit of vegetable is undigested prior to extraction, having not been physically comminuted or treated enzymically or chemically to alter insoluble solids within the fruit or vegetable.

13. The food additive of claim 12 wherein the sliced fruit has not been macerated or milled.

14. The food additive of claim 12 wherein the sliced fruit has not been treated by alkali or acid.

15. The food additive of claim 12 wherein the slicing disrupts only about 0.5% of the cell walls.

16. The food additive of claim 8 wherein the pieces of fruit is sliced so that the soluble solids have a diffusion path to the extraction liquid of not longer than about 1.5 mm.

17. The food additive of claim 8 wherein the extraction liquid is water.

18. The food additive of claim 17 wherein the extraction is by a countercurrent method, wherein the sliced fruit or vegetable material is carried in one direction whereas the extraction liquid is carried in the opposite direction.

19. The food additive of claim 18 wherein greater than 90% of the water soluble solids are removed.

20. The food additive of claim 18 wherein between about 93% to about 99% of the soluble solids are removed.

21. The food additive of claim 8 wherein the the first fruit or vegetable being one or more selected from the group consisting of citrus and carrot, and the second fruit or vegetable being one or more selected from the group consisting of grape, apple and cranberry.

* * * * *